United States Patent

Link

[15] 3,651,310

[45] Mar. 21, 1972

[54] SYSTEM FOR CREDIT CARD VALIDATOR AND IMPRINTER

[72] Inventor: John T. Link, New Haven, Ind.

[73] Assignee: The Magnavox Company, Fort Wayne, Ind.

[22] Filed: Mar. 26, 1970

[21] Appl. No.: 22,957

[52] U.S. Cl..............................235/61.7 B, 194/4 F, 200/46, 235/61.112, 340/149 A

[51] Int. Cl...................G07f 7/02, H01h 43/08, G06k 7/04, G06k 17/00

[58] Field of Search......................235/61.7, 61.112; 200/46; 179/6.3; 340/149; 194/4 F

[56] References Cited

UNITED STATES PATENTS

| | | | |
|---|---|---|---|
| 3,530,280 | 9/1970 | Goldman | 235/61.7 |
| 3,039,582 | 6/1962 | Simjian | 194/4 |
| 3,465,289 | 9/1969 | Klein | 340/149 |
| 3,470,358 | 9/1969 | Sallach | 235/61.11 |
| 3,328,541 | 6/1967 | Ryno | 200/46 |
| 2,977,024 | 3/1961 | Harris | 222/2 |
| 3,474,230 | 10/1969 | McMillen | 235/61.7 |
| 3,217,643 | 11/1965 | Crissy | 101/401.1 |
| 3,394,246 | 7/1968 | Goldman | 235/61.7 |

*Primary Examiner*—Maynard R. Wilbur
*Assistant Examiner*—Robert M. Kilgore
*Attorney*—Richard T. Seeger

[57] ABSTRACT

A self contained system for both imprinting the information present on a credit card and determining if that credit card has been invalidated for any of several reasons is disclosed. The system serially senses the multi-digit credit card number while the imprinting is taking place and transmits this number to a scratch pad memory. This number is then compared serially to a list of invalid credit card numbers and if a match takes place, an indicator is energized to indicate invalidity of the card.

4 Claims, 4 Drawing Figures

PATENTED MAR 21 1972 3,651,310
SHEET 1 OF 2
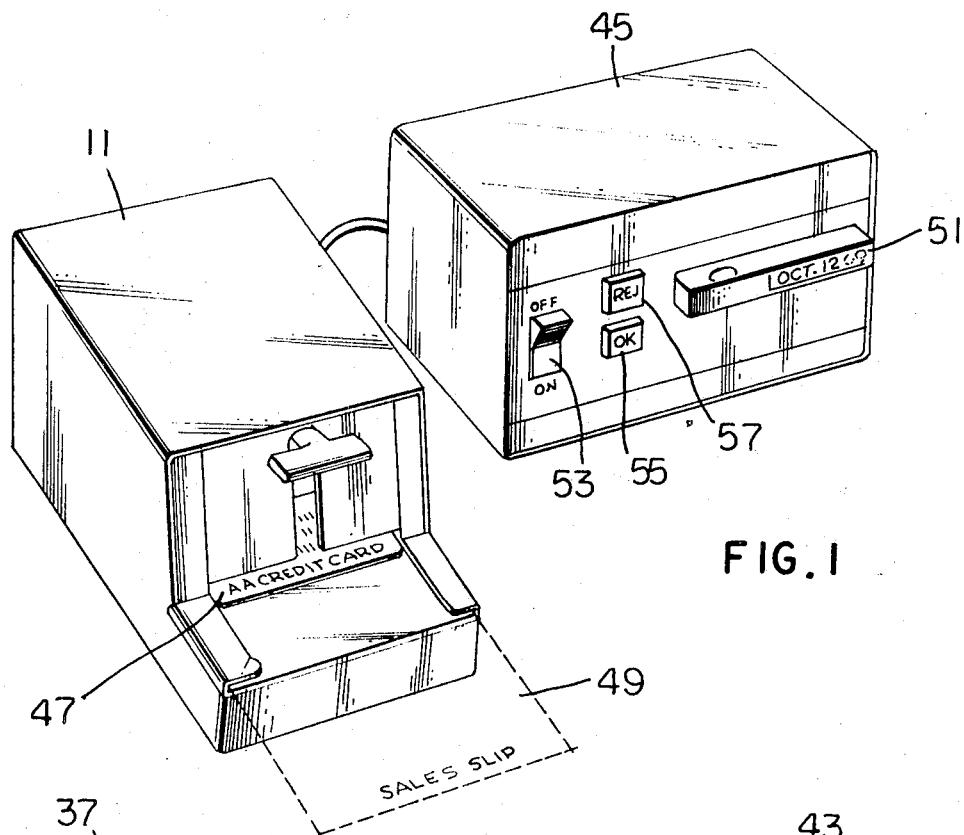
FIG. 1
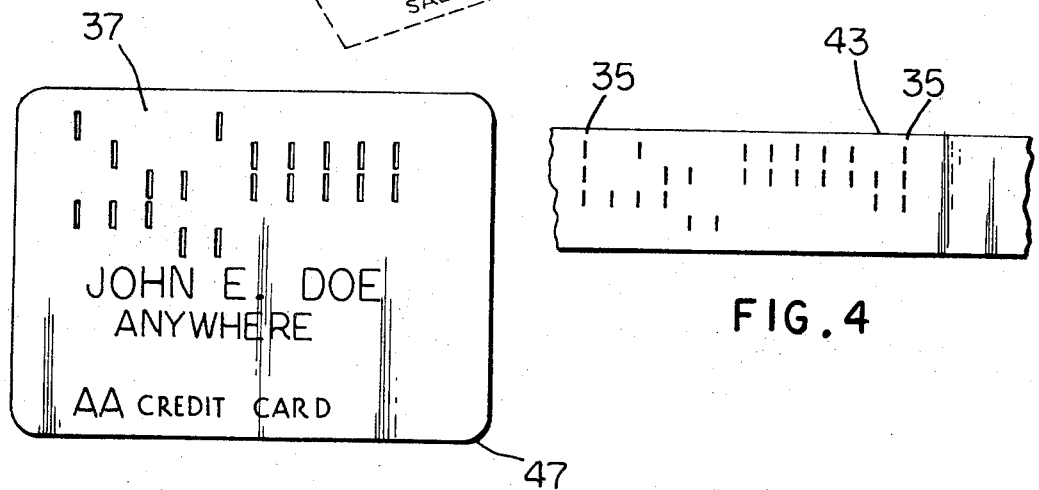
FIG. 3
FIG. 4
INVENTOR
JOHN T. LINK
by JEFFERS & YOUNG
Attorneys INVENTOR
JOHN T. LINK
by JEFFERS & YOUNG
Attorneys

SYSTEM FOR CREDIT CARD VALIDATOR AND IMPRINTER

BACKGROUND OF THE INVENTION

Typically the information on a credit card is mechanically imprinted on a sales receipt by a clerk in a retail store at the time of a sale and in theory the clerk should check the number of the credit card against a periodically updated printed list of credit cards which have been lost, stolen or are otherwise invalid prior to the time the customer leaves the premises with the merchandise. Due to lack of time or lethargy, retail sales personnel often fail to carefully scrutinize the list to make sure that the credit card is valid and if they do check the list it requires a substantial amount of nonproductive time. Accordingly, the present invention performs automatically this list checking process while the clerk or attendant is filling out the sales slip with such details as the merchandise purchased, quantity, cost and other information.

SUMMARY OF THE INVENTION

The present invention overcomes the rather substantial defects in the prior art procedure of validating or verifying that a credit card is an acceptable one by automatically performing an electronic search of a prerecorded tape which contains a list of all invalid credit cards. This search can be completed and a simple yes/no response given to a clerk who need have no special training to operate the device. The invention also provides for a parity check which serves to detect a credit card which has been altered or is for some other reason sensed by the card reader improperly.

According to the teachings of the present invention, a standard receipt imprinting mechanism is additionally provided with electrical sensors which will sense apertures, embossments, magnetic or other indicia on the credit card and transfer this identifying information to a scratch pad memory. As soon as this information is loaded in the scratch pad memory a prerecorded magnetic tape which has listed upon it all invalid credit card numbers is scanned and a comparison is performed between each credit card identifying word on the tape and the corresponding number in the scratch pad memory. In the event that the particular credit card is listed on the tape, an invalidity signal is generated.

Accordingly, it is one object of the present invention to effect a substantial saving of the time of retail sales personnel in credit card transactions.

It is a further object of the present invention to materially increase the probability that such sales personnel will detect the attempted use of invalid credit cards.

Another object of the present invention is to provide a time saving method of discovering invalid credit cards and prevent their use.

The present invention contemplates an imprinting device somewhat larger than present day imprinting devices which contains a ¼-inch inexpensive cassett mounted tape having an ordered list of invalid credit card numbers recorded on it. It is contemplated that new cassetts containing an updated list of invalid numbers will be issued periodically from a central location to the several retail locations and at these retail locations the old cassett will be removed from the device and the new one substituted for it and the old cassett returned to the central location to provide a tape for a future updated list. The reader and imprinter may, of course, be separate units.

It is a salient object of the present invention to provide an automatic self contained credit card validator.

It is a still further object of the present invention to provide a method which ensures that up-to-date information on invalid credit cards will invariably be checked against each credit card used so as to ensure the detection of invalid cards.

A considerable amount of money is lost to businesses through the use of invalid credit cards and as an example, gasoline service station losses have been estimated at $50 per week on the use of lost, stolen or obsolete credit cards and the problem has become so substantial that some oil companies offer a reward to service station attendants for detecting and taking out of circulation each such invalid card.

Accordingly, it is another object of the present invention to lower the losses sustained by businesses in credit card transactions.

It is still another object of the present invention to provide a credit card validator, the cost of which will be exceeded by the savings effected in detecting invalid cards.

It is yet another object of the present invention to detect credit cards which may have been altered or improperly read.

BRIEF DESCRIPTION OF THE DRAWING

The above noted as well as other objects and advantages of the present invention will be more readily understood from a consideration of the following detailed description which proceeds with reference to the accompanying drawings in which:

FIG. 1 illustrates a typical mechanism suitable for imprinting the credit card information on a sales receipt and sensing the appropriate information to be stored and compared with the list of invalid cards;

FIG. 3 illustrates a credit card suitable for use with the present invention; and FIG. 4 illustrates the format of the magnetic tape record.

DESCRIPTION OF THE PREFERRED EMBODIMENT

Figure 2:
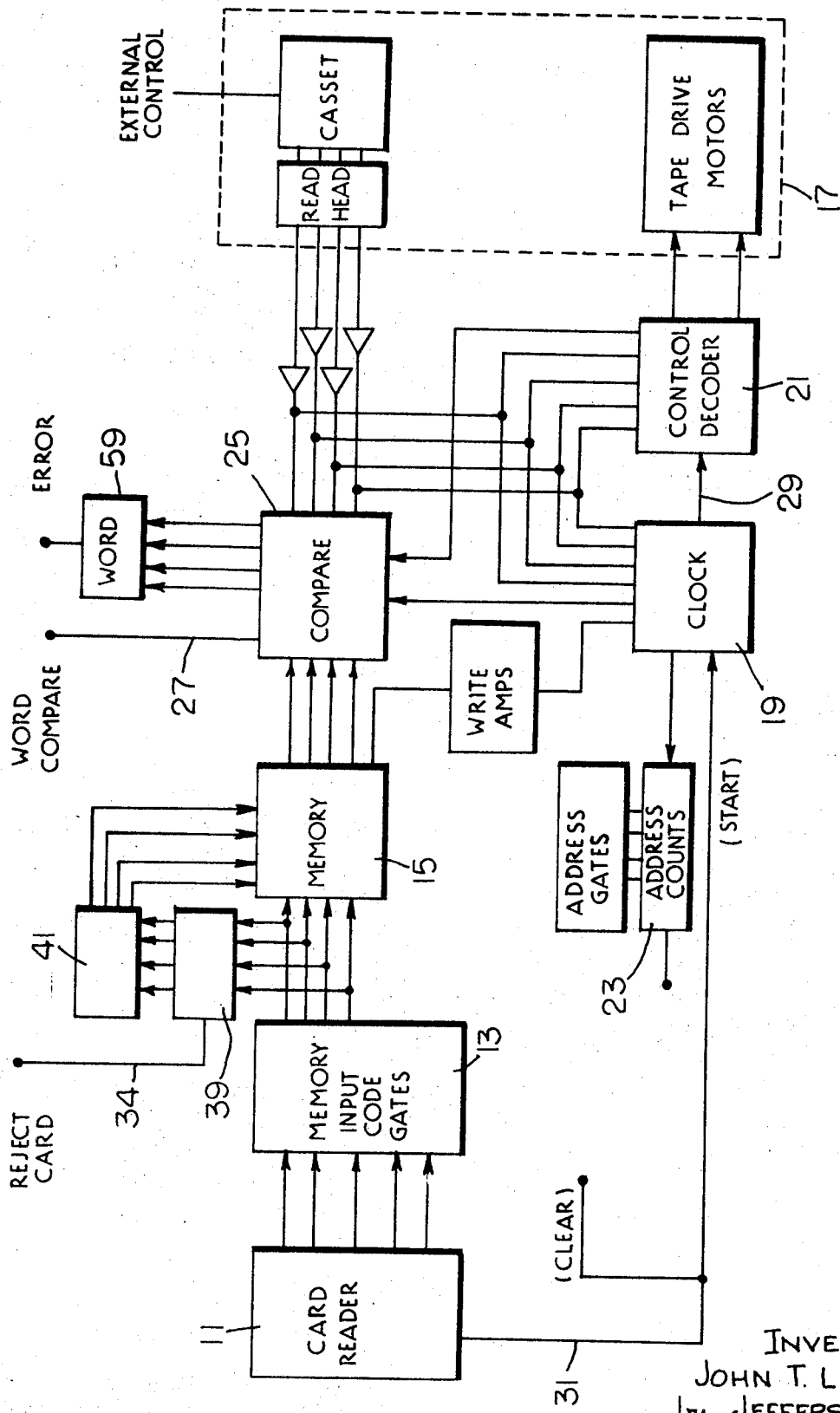
FIG. 2 is a block diagram of the overall system of the present invention.

Looking first at FIG. 2 which illustrates in block diagram form the present invention a card reader 11 imprints a sales receipt with the information on the individual credit card and transmits serially by character the credit card number or other identifying indicia to the memory input code gates 13. A credit card will typically contain indicia indicative of a nine to 12 character number as well as the name of the credit card owner and perhaps his address. The method of the present invention contemplates reading a first portion of the information present on the card, e.g., the nine to 12 digit identifying number and transmitting this first portion of the indicia to the memory input gates while simultaneously or subsequently imprinting on a separate document such as a sales receipt, the name and address of the credit card owner as well as the nine to 12 character credit card number. Thus, the first portion of the card indicia which is transmitted to the memory input code gates and the second portion of the card indicia which is to be imprinted on a sales receipt may be identical, or one may comprise only a portion of the other or they may be entirely distinct portions of the indicia on the card. The present illustrative embodiment will consider a card having the owners name and address and nine to 12 serial characters each of which is a two out of five coded numeric character. In this instance the information imprinted on the receipt may be both the multidigit two out of five coded number and the owner's name and address but the information transmitted to the memory input code gates would be only the nine to 12 character two out of five coded numeric. It is, of course, within the contemplation of the present invention that a more sophisticated sensing system could be devised to detect either an embossed arabic numeral system, coded apertures or magnetic indicia indicative of the credit card number.

As the card reader senses the information on the card and transmits it to the memory input code gates 13, an indication is also supplied by way of line 31 to clear the indications preparatory to processing the new card and to energize system clock 19 to store the card number in memory.

The memory input code gates 13 effect a code conversion, in this embodiment a coversion from the two out of five code on the card to a four bit character code. The characters are then transferred serially by character to the 4 × 16 scratch pad memory 15 for subsequent comparison purposes. A word parity character is also loaded into the memory 15 along with the number. As soon as the entire credit card number and parity check character are loaded into the memory 15, a signal is transmitted to the tape drive control circuits on line 29 to start the tape.

The magnet tape device 17 uses a ¼-inch cassett mounted tape. Signals are recorded on four channels of the tape as illustrated in FIG. 4 using a saturated nonreturn to zero and self clocking code. An end of record code is located at the beginning and the end of the entire list and an end of number code 35 is recorded between each multi-character credit card number on the list. Timing of the system between the time that the card reader 11 begins to sense characters and the time the scratch pad memory 15 has been loaded is from an oscillator in clock 19, however, once the scratch pad memory has been loaded all control of the processor is transferred to the tape control decode logic 21 and clock 19 is driven by the signals being read from the tape. This logic 21 is clocked by tape generated clock pulses and the function performed are the result of control codes read from the tape, thus at an end of number code this logic strobes the compare logic and resets the scratch pad address counter 23. When an end of record code is read this logic stops the tape drive and resets all of the logic circuitry for the next cycle for a new credit card. The clear signal associated with line 31 resets the light indications. When a card is checked, its status is displayed on these indications and persists until a new card is checked.

The comparator 25 performs a character by character comparison of the number being read from the scratch pad memory 15 and the numbers being read from the tape. At each end of number code, the comparison logic and the scratch pad memory are recycled and the comparison logic is strobed to determine if a locate or favorable comparison has been made. If a number on the tape does compare favorably to the number stored in the scratch pad memory, the locate indicator is energized by a signal on the word compare line 27, indicating that the card under consideration is invalid.

At the time the credit card number is passed from the memory input code gates 13 to the scratch pad memory 15, a parity check is performed to determine if the credit card has been altered or if the card number has been read incorrectly. In the event that the parity check fails, a reject card signal appears on line 34 in which event the operator should either examine the card or run it through the card reader a second time in an attempt to find why the card was rejected. For further error checking purposes not only is the parity check performed on the parity row 37 of the credit card by parity checker 39, but this "columnar" parity is converted to a row parity in the parity converter 41 so as to allow further error checking against the numbers read from the four track tape.

The process of the present invention may be summarized by the following steps: A credit card is inserted in the card reader 11. The number is read from the card serially by character and each character code is checked to assure it is a valid code. If this parity check fails, a reject card signal is applied on line 35 and the card will be either rerun or examined by the operator to determine the cause of the reject indication. Contemporaneously, desired information may be transferred from the card to a separate document such as a receipt. The character codes may be converted to another code having row rather than column parity bits and are then loaded into the scratch pad memory. At this point, the tape is started in motion and a character by character comparison is effected between the number stored in the scratch pad memory and a series of numbers appearing on the tape. As each number is read from the tape, a parity check is made to determine that it is a valid number. If a favorable comparison is found and the parity is correct, a locate is indicated on line 27 and the credit card is rejected. When an end of record code is detected, the tape is stopped and all logic is reset to process the next credit card. Although the present invention contemplates rewinding the tape prior to processing the next credit card, it is clear that minor modifications in the circuitry would allow one card to be compared to the items on the tape while the tape is running in one direction and the next card might be compared to those items on the tape with the tape running in the reverse direction.

Some detail of the data format and operating parameters of a specific embodiment of the present invention may aid the readers understanding of the present invention. The credit card has the 10 character word which indicates the card number embossed in a two out of five code having even parity, the following decimel characters being shown with their binary equivalent:

|  | Bit | Parity Bit 5 | 4 | 3 | 2 | 1 |
|---|---|---|---|---|---|---|
| Character | 0 |  | 0 | 1 | 1 | 0 | 0 |
|  | 1 |  | 1 | 0 | 0 | 0 | 1 |
|  | 2 |  | 1 | 0 | 0 | 1 | 0 |
|  | 3 |  | 0 | 0 | 0 | 1 | 1 |
|  | 4 |  | 1 | 0 | 1 | 0 | 0 |
|  | 5 |  | 0 | 0 | 1 | 0 | 1 |
|  | 6 |  | 0 | 0 | 1 | 1 | 0 |
|  | 7 |  | 1 | 1 | 0 | 0 | 0 |
|  | 8 |  | 0 | 1 | 0 | 0 | 1 |
|  | 9 |  | 0 | 1 | 0 | 1 | 0 |
| Word Mark |  |  |  | 1 | 1 | 1 | 0 |
| Record Mark |  |  |  | 1 | 1 | 1 | 1 |

The list of invalid credit card numbers was recorded on the magnetic tape in four tracks each number being 10 characters in length and being preceded and followed by a word mark which of course is a four bit character not otherwise appearing as the data bits equivalent to any decimal digit. The tape further includes an end of record code 35 in FIG. 4 which again does not otherwise appear in the above list of data bits. In this particular instance, the code conversion which takes place in the memory input code gates 13 is merely the dropping of the character parity bits and the appending of a word parity character. Thus, FIG. 3 illustrates a credit card which is the property of John E. Doe and numbered 2,965,100,000. On this particular card, the bottom four of the five rows are the actual data bits embossed on the card and the top row 37 consists of the parity bits, thus in the card of FIG. 3, the first column has an embossed mark in the top or parity row and then has the absence of embossments in the next two rows indicating zeros in those positions as well as in the fifth row and again an embossment appears in the first column of the fourth row indicating a one in that position. As shown in the above table, this first column then represents the arabic numeral 2. Similar analysis is possible in the other columns to determine the specific credit card number.

If invalid, the credit card of FIG. 3 would appear on the magnetic tape in the format illustrated in FIG. 4 for again a vertical line represents an area of the tape magnetized to represent a zero. In FIG. 4, John Doe's credit card number is preceded on the left by a word mark 35 then appears the 10 digit number in a four bit binary code which does not include the parity bits for the individual characters involved but rather is followed by a parity character 43. This parity character while quite arbitrary has been selected in FIG. 4 to give even parity to each of the four channels. Note that the word mark is not included in determining the word parity although it equally well could be. The word parity character of FIG. 4 is followed by another word mark 35 which serves to separate John Doe's credit card number from the next invalid number on the tape.

In a specific embodiment of the present invention utilizing a ¼-inch cassett mounted tape a density of 650 bits per inch and a play back speed of 5 ⅝ inches per second was achieved. A total of 9,150 invalid credit card numbers were recorded on the tape and 30 seconds was required to effect the search to determine whether a given credit card appeared on the list of invalid cards.

FIG. 1 illustrates one possible configuration for the card reader 11 and the cassett and logic containing module 45. A credit card 47 and a sales slip 49 are inserted in the reader and the lever actuated to cause the sales slip to be imprinted and the credit card number to be read. Module 45 contains the magnetic tape cassett 51, an on/off switch 53, and a normally energized O.K. or valid light 55 which will be extinguished and the normally deenergized reject light 57 energized in the event of a signal on line 27 of FIG. 2. It is, of course, also possible to have this front panel with a further indicator which is energized when the reject card line 35 is energized and yet another indicator which would be energized in the event of an error in the parity of a credit card number read from the tape. Such word parity error would be supplied by the word parity detector 59. A model C reader imprinter manufactured by AMP, Inc., Harrisburg, Pa. has been used effectively in a preferred embodiment of the present invention.

It will thus be seen that the present invention provides a new and improved scheme for validating credit cards, the cost of which will rapidly be exceeded by the savings effected in detecting such cards. Numerous modifications will suggest themselves to those of ordinary skill in the art in light of the foregoing disclosure. Thus, for example, the memory 15 while taught as being a nondestructive readout type of memory in which the various characters are read out in sequence could equally well be constructed as a recirculating shift register or delay line properly synchronized with the reading of the corresponding characters from the magnetic tape. As another example different codes could be used either on the card or on the tape or both and other than a four channel tape might be used. These as well as other modifications will readily suggest themselves to those of ordinary skill in the art and accordingly the scope of the present invention is to be measured only by that of the appended claims.

I claim:

1. A credit validator comprising:
   means for reading identifying information on a credit card;
   first storage means coupled to said reading means and adapted to store said identifying information;
   register means coupled between said means for reading and said first storage means and adapted to convert the identifying information read by said means for reading into a four bit per character format;
   second storage means adapted to store a plurality of identification words corresponding to invalid credit cards, said second storage means comprising a prerecorded magnetic tape adapted to store said identification words in a four bit per character serial by character format;
   comparison means adapted to compare the information stored in said first storage means with each of the identification words stored in said second storage means and responsive to an identity between the information stored in said first storage means and one of the words stored in said second storage means to provide an indication of invalidity of the credit card; and
   timing means operatively coupled to said first storage means, said second storage means and said comparison means to synchronize the reading of characters from said first and second storage means.

2. The credit card validator of claim 1 wherein initial control of said timing means is effected by said means for reading and after the reading of said magnetic tape is initiated, control of said timing means is effected by the characters read from said magnetic tape.

3. The credit card validator of claim 1 wherein initial control of said timing means is effected by said means for reading and after the reading of said magnetic tape is initiated, control of said timing means is effected by the characters read from said magnetic tape.

4. A credit card validator comprising:
   means for reading identifying information on a credit card;
   first storage means coupled to said reading means and adapted to store said identifying information;
   magnetic tape storage means adapted to store a plurality of identification words corresponding to invalid credit cards;
   comparison means adapted to compare the information stored in said first storage means with each of the identification words stored on said magnetic tape storage means and responsive to an identity between the information stored in said first storage means and one of the words stored on said magnetic tape storage means to provide an indication of invalidity of the credit card;
   input register means coupled between said card reader and said first storage means and adapted to convert the identifying information read by said card reader into a format compatible with the information stored on said magnetic tape storage means; and
   timing means operatively coupled to said first storage means, said magnetic tape storage means and said comparison means to synchronize the reading of characters from said first storage means and said magnetic tape storage means.

* * * * *